US008600598B2

(12) United States Patent
Simonini et al.

(10) Patent No.: US 8,600,598 B2
(45) Date of Patent: Dec. 3, 2013

(54) THERMAL CONDITIONING OF VEHICLE RECHARGEABLE ENERGY STORAGE SYSTEMS

(75) Inventors: Matthew Simonini, Milford, MI (US); Jonathan K. Williams, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 13/156,255

(22) Filed: Jun. 8, 2011

(65) Prior Publication Data

US 2012/0316712 A1 Dec. 13, 2012

(51) Int. Cl.
*B60L 11/18* (2006.01)
*H01M 10/50* (2006.01)
*G01C 21/26* (2006.01)

(52) U.S. Cl.
USPC .......................................................... 701/22

(58) Field of Classification Search
CPC .......................... B60L 11/1874; B60L 11/1875
USPC ........................................................... 701/22
See application file for complete search history.

(56) References Cited

U.S. PATENT DOCUMENTS

| 7,783,396 | B2 * | 8/2010 | Arita et al. ....................... 701/22 |
| 2002/0188387 | A1 * | 12/2002 | Woestman et al. .............. 701/22 |
| 2005/0214608 | A1 * | 9/2005 | Ootake et al. .................... 429/24 |
| 2008/0012535 | A1 * | 1/2008 | Takatsuji et al. ............... 320/150 |
| 2010/0324765 | A1 * | 12/2010 | Iida et al. ......................... 701/22 |
| 2011/0066310 | A1 * | 3/2011 | Sakai et al. ....................... 701/22 |
| 2011/0153140 | A1 * | 6/2011 | Datta et al. ....................... 701/29 |
| 2011/0214930 | A1 * | 9/2011 | Betts et al. .................... 180/65.1 |
| 2012/0041629 | A1 * | 2/2012 | Yamada et al. .................. 701/22 |
| 2012/0158228 | A1 * | 6/2012 | Biondo et al. ................... 701/22 |

FOREIGN PATENT DOCUMENTS

| JP | 2006139963 A | * | 6/2006 |
| JP | 2007097359 A | * | 4/2007 |
| WO | WO 2010113496 A1 | * | 10/2010 |

OTHER PUBLICATIONS

JPO machine translation of JP 2006-139963.*
JPO machine translation of JP 2006-139963 (original JP document published Jun. 1, 2006).*
USPTO, U.S. Appl. No. 12/894,553, Sep. 30, 2010.

* cited by examiner

*Primary Examiner* — James Trammell
*Assistant Examiner* — David Testardi
(74) *Attorney, Agent, or Firm* — Ingrassia Fisher & Lorenz, P.C.

(57) ABSTRACT

Methods, systems, and vehicles are provided that provide for thermal conditioning of a vehicle rechargeable energy storage system (RESS). A thermal conditioning system is configured to apply a plurality of thermal conditioning actions for the RESS. A control system is configured to determine a driving route for the vehicle for a drive cycle of the vehicle, select one of the plurality of thermal conditioning actions based at least in part on the driving route, and provide instructions for the thermal conditioning system to apply the selected one of the plurality of thermal conditioning actions for the RESS.

17 Claims, 6 Drawing Sheets

THERMAL CONDITIONING OF VEHICLE RECHARGEABLE ENERGY STORAGE SYSTEMS

TECHNICAL FIELD

The present disclosure generally relates to the field of vehicles and, more specifically, to methods and systems for thermal conditioning of rechargeable energy storage systems of vehicles.

BACKGROUND

Certain vehicles, particularly electric vehicles and hybrid electric vehicles, have rechargeable energy storage systems (RESS), such as batteries. In certain existing techniques, the RESS is thermally conditioned in accordance with a single set of criteria corresponding to average or typical driving characteristics (for example, a driver with average or typical driving patterns, and the like). However, such existing techniques may not provide thermal conditioning of the RESS with optimal energy efficiency for drivers and/or driving patterns that differ from the average or typical characteristics.

Accordingly, it is desirable to provide improved methods for thermal conditioning of vehicle RESS, for example to improve energy efficiency of the thermal conditioning. It is also desirable to provide improved systems for such thermal conditioning of vehicle RESS, and for vehicles that include such methods and systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for thermally conditioning a rechargeable energy storage system (RESS) of a vehicle during a drive cycle. The method comprises the steps of determining a driving route for the vehicle for the drive cycle, selecting one of a plurality of thermal conditioning actions based at least in part on the driving route, and conditioning the RESS by applying the selected one of the plurality of thermal conditioning actions.

In accordance with another exemplary embodiment, a control system is provided for thermally conditioning a rechargeable energy storage system (RESS) of a vehicle during a drive cycle. The control system comprises a thermal conditioning system and a controller. The thermal conditioning system is configured to apply a plurality of thermal conditioning actions for the RESS. The controller is coupled to the thermal conditioning system. The controller is configured to determine a driving route for the vehicle for the drive cycle, select one of the plurality of thermal conditioning actions based at least in part on the driving route, and provide instructions for the thermal conditioning system to apply the selected one of the plurality of thermal conditioning actions for the RESS.

In accordance with a further exemplary embodiment, a vehicle is provided. The vehicle comprises a drive system, a thermal conditioning system, and a control system. The drive system includes a rechargeable energy storage system (RESS). The thermal conditioning system is coupled to the RESS, and is configured to apply a plurality of thermal conditioning actions for the RESS. The control system is coupled to the thermal conditioning system. The control system is configured to determine a driving route for the vehicle for a drive cycle of the vehicle, select one of the plurality of thermal conditioning actions based at least in part on the driving route, and provide instructions for the thermal conditioning system to apply the selected one of the plurality of thermal conditioning actions for the RESS.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
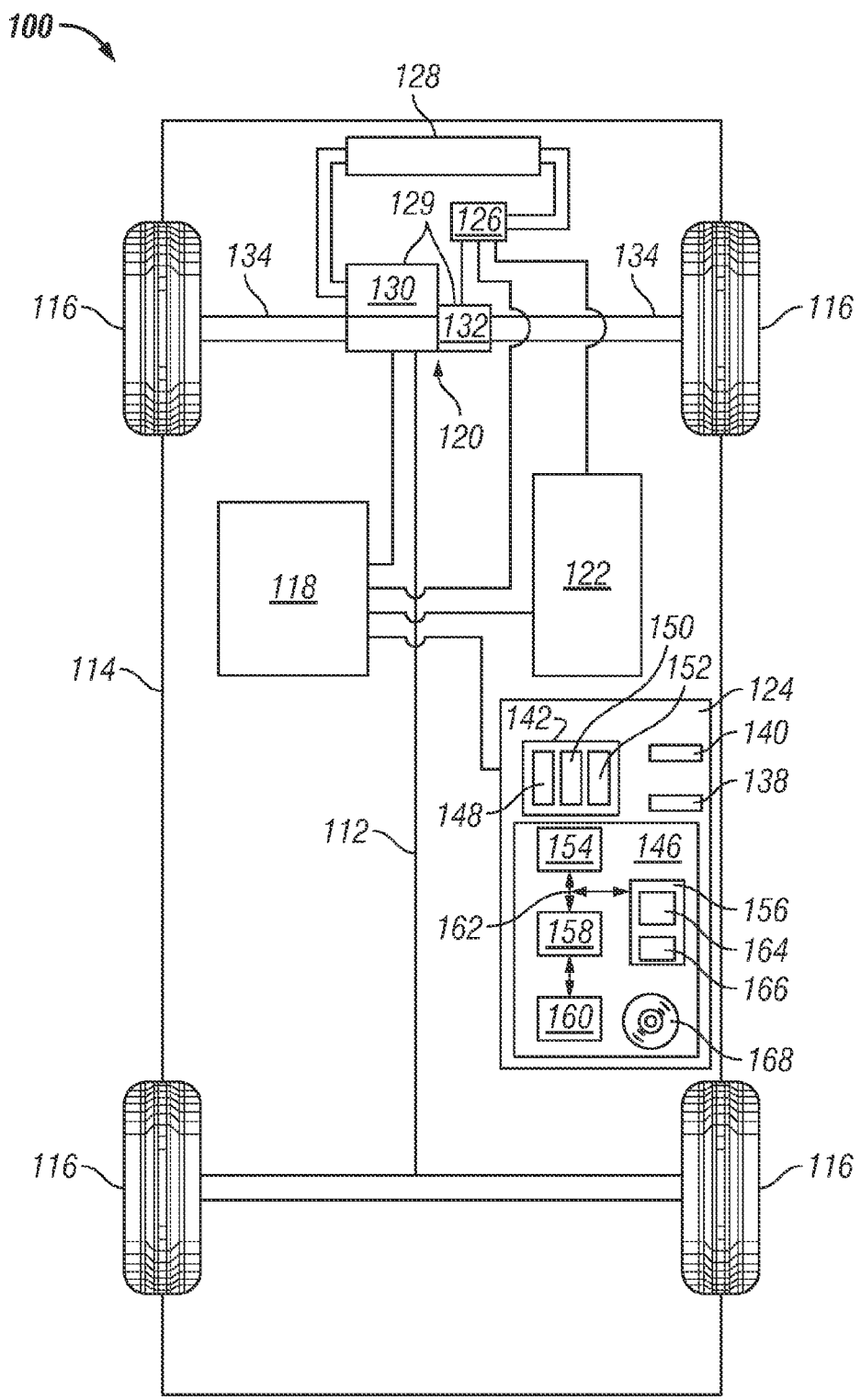
FIG. 1 is a functional block diagram of a vehicle that includes a rechargeable energy storage system (RESS) and a control system for thermally conditioning the RESS, in accordance with an exemplary embodiment.

FIG. 1 illustrates a vehicle 100, or automobile, according to an exemplary embodiment. As described in greater detail further below, the vehicle 100 is configured to thermally condition a rechargeable energy storage system (RESS) of a the vehicle 100 in a manner that optimizes energy efficiency of the thermal conditioning in accordance with characteristics of the current driving route.

The vehicle 100 includes a chassis 112, a body 114, four wheels 116, and an electronic control system 118. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 120, the above-referenced RESS 122, an RESS control system 124, a power inverter assembly (or inverter) 126, and a radiator 128. The actuator assembly 120 includes at least one electric propulsion system 129 mounted on the chassis 112 that drives the wheels 116.

Specifically, as depicted in FIG. 1, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130.

The RESS 122 is mounted on the chassis 112, and is electrically connected to the inverter 126. The RESS 122 preferably comprises a rechargeable battery having a pack of battery cells. In one embodiment, the RESS 122 comprises a lithium iron phosphate battery, such as a nanophosphate lithium ion battery. Together the RESS 122 and the electric propulsion system 129 provides a drive system to propel the vehicle 100. The RESS 122 is thermally conditioned by the RESS control system 124, described below.

As depicted in FIG. 1, the RESS control system 124 includes a thermal conditioning system 138, a navigation system 140, a sensor array 142, and a controller 146. In addition, although not illustrated as such, the RESS control system 124 (and/or one or more components thereof) may be integral with the electronic control system 118 and may also include one or more power sources.

The navigation system 140 receives inputs from a driver or other occupant of the vehicle, and also receives information pertaining to the geographic location of the vehicle over time (preferably via one or more satellite communication connections). The navigation system 140 preferably comprises a global positioning system (GPS) device. The navigation system 140 determines a driving route and other location data based on this information, and provides information pertaining thereto to the controller 146 for processing and for use in optimizing the temperature conditioning of the RESS 122.

The sensor array 142 includes one or more ambient temperature sensors 148, one or more RESS sensors 150, and one or more thermal conditioning system sensors 152, among other various possible sensors. The ambient temperature sensors 148 are preferably disposed proximate the RESS 122. The ambient temperature sensors 148 measure an ambient temperature outside (and preferably adjacent to) the RESS 122. The ambient temperature sensors 148 provide signals and/or information pertaining to the measurements to the controller 146 for processing and for use in thermally conditioning the RESS 122.

The RESS sensors 150 are also preferably disposed proximate the RESS 122. The RESS sensors 150 measure one or more values (including a resistance of, or values for use in determining a resistance of) the RESS 122. The RESS sensors 150 provide signals and/or information pertaining to the measurements to the controller 146 for processing and for use in thermally conditioning the RESS 122.

The thermal sensors 152 are preferably disposed within or proximate to the thermal conditioning system 138. The thermal sensors 152 measure one or more values for use by the thermal conditioning system 138 for thermally conditioning the RESS 122 based on instructions provided by the controller 146.

The controller 146 is coupled to the navigation system 140, the sensor array 142, the RESS 122, and the electronic control system 118. The controller 146 utilizes the data and information from the navigation system 140 (including the location information and information pertaining to the driving route of the current drive cycle) and the measured values from the sensor array 142 in thermally conditioning the RESS 122 via the thermal conditioning system 138 in a manner that optimizes energy efficiency for the characteristics of the particular driving route. In a preferred embodiment, the controller 146 performs these functions in accordance with steps of the processes 400, 500, 600 described further below in connection with FIGS. 4-6.

As depicted in FIG. 1, the controller 146 comprises a computer system. In certain embodiments, the controller 146 may also include one or more of the sensors 148, 150, 152, the navigation system 140, the electronic control system 118 and/or portions thereof, and/or one or more other devices. In addition, it will be appreciated that the controller 146 may otherwise differ from the embodiment depicted in FIG. 1. For example, the controller 146 may be coupled to or may otherwise utilize one or more remote computer systems and/or other control systems.

In the depicted embodiment, the computer system of the controller 146 includes a processor 154, a memory 156, an interface 158, a storage device 160, and a bus 162. The processor 154 performs the computation and control functions of the controller 146, and may comprise any type of processor or multiple processors, single integrated circuits such as a microprocessor, or any suitable number of integrated circuit devices and/or circuit boards working in cooperation to accomplish the functions of a processing unit. During operation, the processor 154 executes one or more programs 164 contained within the memory 156 and, as such, controls the general operation of the controller 146 and the computer system of the controller 146, preferably in executing the steps of the processes described herein, such as the steps of the processes 400, 500, 600 described further below in connection with FIGS. 4-6.

The memory 156 can be any type of suitable memory. This would include the various types of dynamic random access memory (DRAM) such as SDRAM, the various types of static RAM (SRAM), and the various types of non-volatile memory (PROM, EPROM, and flash). The bus 162 serves to transmit programs, data, status and other information or signals between the various components of the computer system of the controller 146. In a preferred embodiment, the memory 156 stores the above-referenced program 164 along with one or more stored values 166 for use in thermal conditioning of the RESS 122. In certain examples, the memory 156 is located on and/or co-located on the same computer chip as the processor 154.

The interface 158 allows communication to the computer system of the controller 146, for example from a system driver and/or another computer system, and can be implemented using any suitable method and apparatus. It can include one or more network interfaces to communicate with other systems or components. The interface 158 may also include one or more network interfaces to communicate with technicians, and/or one or more storage interfaces to connect to storage apparatuses, such as the storage device 160.

The storage device 160 can be any suitable type of storage apparatus, including direct access storage devices such as hard disk drives, flash systems, floppy disk drives and optical disk drives. In one exemplary embodiment, the storage device 160 comprises a program product from which memory 156 can receive a program 164 that executes one or more embodiments of one or more processes of the present disclosure, such as the steps of the processes 400, 500, 600 of FIGS. 4-6, described further below. In another exemplary embodiment, the program product may be directly stored in and/or otherwise accessed by the memory 156 and/or a disk (e.g., disk 168), such as that referenced below.

The bus 162 can be any suitable physical or logical means of connecting computer systems and components. This includes, but is not limited to, direct hard-wired connections, fiber optics, infrared and wireless bus technologies. During operation, the program 164 is stored in the memory 156 and executed by the processor 154.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 154) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 146 may also otherwise differ from the embodiment depicted in FIG. 1, for example in that the computer system of the controller 146 may be coupled to or may otherwise utilize one or more remote computer systems and/or other control systems.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 130 and the inverter 126.

The thermal conditioning system 138 thermally conditions the RESS 122. Specifically, the thermal conditioning system 138 utilizes heating and cooling techniques, as appropriate, for heating or cooling the RESS 122, based on instructions provided by the controller 146 (preferably by the processor 154 thereof). The heating and cooling techniques are selected so as to attain the desired heating or cooling of the RESS 122 while optimizing energy efficiency.

Figure 2:
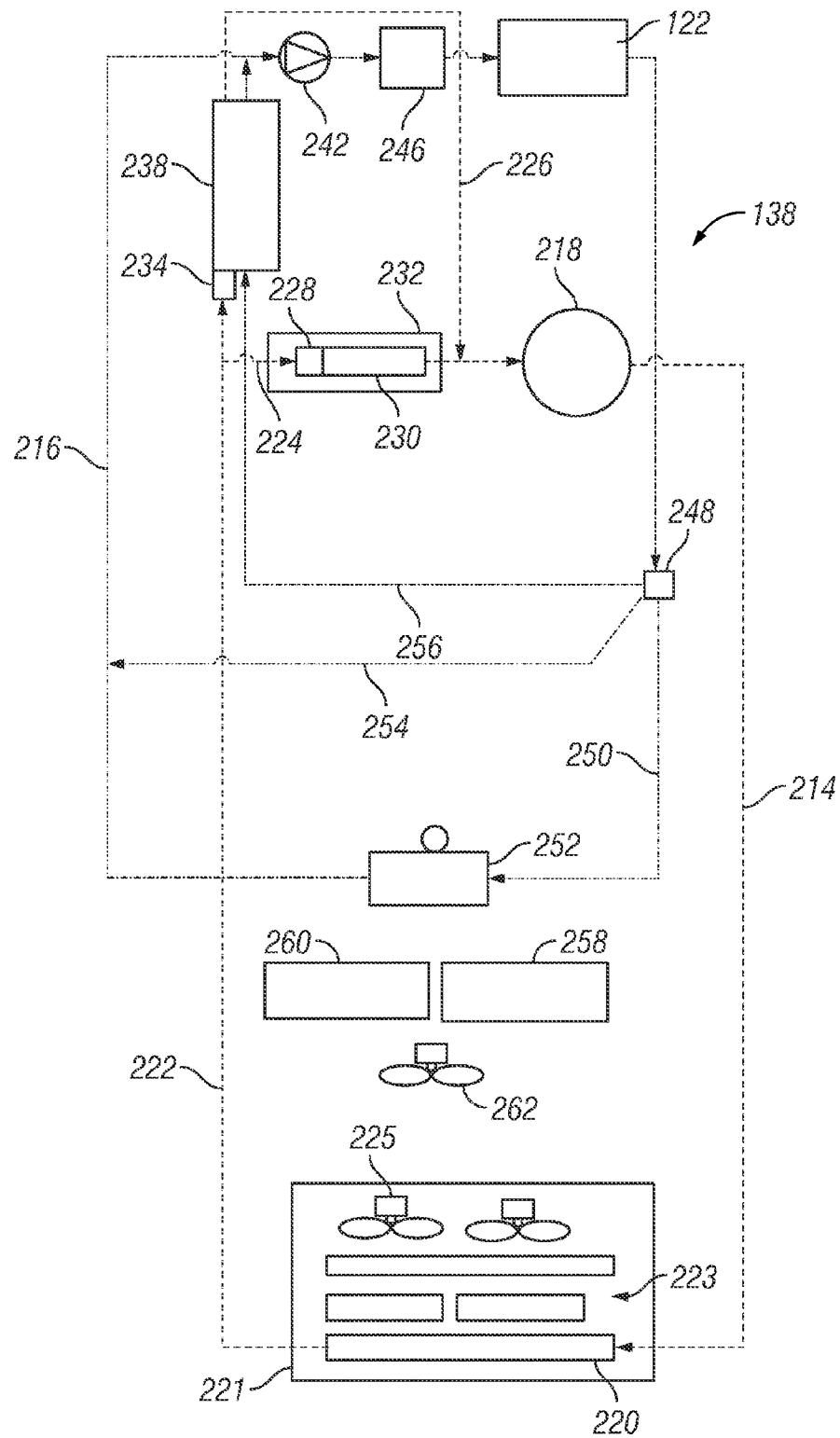
FIG. 2 is a schematic view of a thermal conditioning system of the control system of FIG. 1, in accordance with an exemplary embodiment.

With reference to FIG. 2, a schematic view is provided of the thermal conditioning system 138 of FIG. 1, in accordance with a first exemplary embodiment. As depicted in FIG. 2, the thermal conditioning system 138 includes a refrigerant loop 214 and a coolant loop 216. The thermal conditioning system 138 depicted in FIG. 2 may be used, for example, in a plug-in hybrid electric vehicle or an extended range electric vehicle. Each of the components of the thermal conditioning system 138 are preferably controlled directly or indirectly via instructions provided by the controller 146 of FIG. 1, most preferably by the processor 154 thereof.

As depicted in FIG. 2, the thermal conditioning system 138 includes a refrigerant loop 214 and a coolant loop 216. The refrigerant loop 214 includes a refrigerant compressor 218 and a condenser 220. In certain examples, the refrigerant loop 214 and the refrigerant compressor 218 may be part of a condenser, radiator, fan module (CRFM) 221. The CRFM 221 may include other heat exchangers 223 and fans 225 used to heat or cool fluids from other vehicle systems as well as from the RESS 122 of FIG. 1. In a preferred embodiment, the refrigerant compressor 218 is electrically driven, and is capable of adjusting the speed of the compressor during operation.

The condenser 220 directs refrigerant into a refrigerant line 222 that splits into a heat, ventilation, and air conditioning (HVAC) leg 224 and a chiller leg 226 of the refrigerant loop 214. The HVAC leg 224 directs the refrigerant through an expansion device 228 and into an evaporator 230, which is located in an HVAC module 232. Refrigerant exiting the evaporator 230 may be directed back to the refrigerant compressor 218 through an accumulator.

The chiller leg 226 directs the refrigerant through an expansion device 234 and then through a chiller 238. The chiller 238 preferably comprises a refrigerant-to-coolant heat exchanger. Refrigerant exiting the chiller 238 is directed back to the refrigerant compressor 218 via chiller leg 226.

The chiller 238 is also in fluid communication with the coolant loop 216. The dashed lines in FIG. 2 (and, similarly, in FIG. 3, described further below) represent lines through which refrigerant flows. The dash-dot lines represent lines through which a coolant liquid flows. The coolant liquid may be a conventional liquid mixture such as an ethylene glycol and water mix, or may be some other type of liquid with suitable heat transfer characteristics.

As depicted in FIG. 2, the coolant loop 216 includes a coolant pump 242 that pumps the coolant through the coolant loop 216. The coolant pump 242 is controllable to vary the flow rate of the coolant flowing through the coolant loop 216. The coolant loop 216 also includes the RESS 122 of FIG. 1, and an electric coolant heater 246. The coolant flowing through the RESS 122 is used to cool or warm the RESS as needed. The electric coolant heater 246 can be activated to heat the coolant flowing through it in order to provide warming to the RESS 122.

A four port coolant routing valve 248 is located in the coolant loop 216. The routing valve 248 can be selectively actuated to direct the coolant through three different branches of the coolant loop 216. A first branch 250 includes an RESS radiator 252, which is positioned to have air flowing through it. The RESS radiator 252 may be mounted near an accessory power module 258 and an RESS charger 260, which have air directed through them by a controllable fan 262. A second branch 254 forms a coolant bypass line where the coolant does not flow through the RESS radiator 252 or the chiller 238. A third branch 256 directs the coolant through the chiller 238. All three branches join together to direct the coolant back through the RESS 122.

Figure 3:
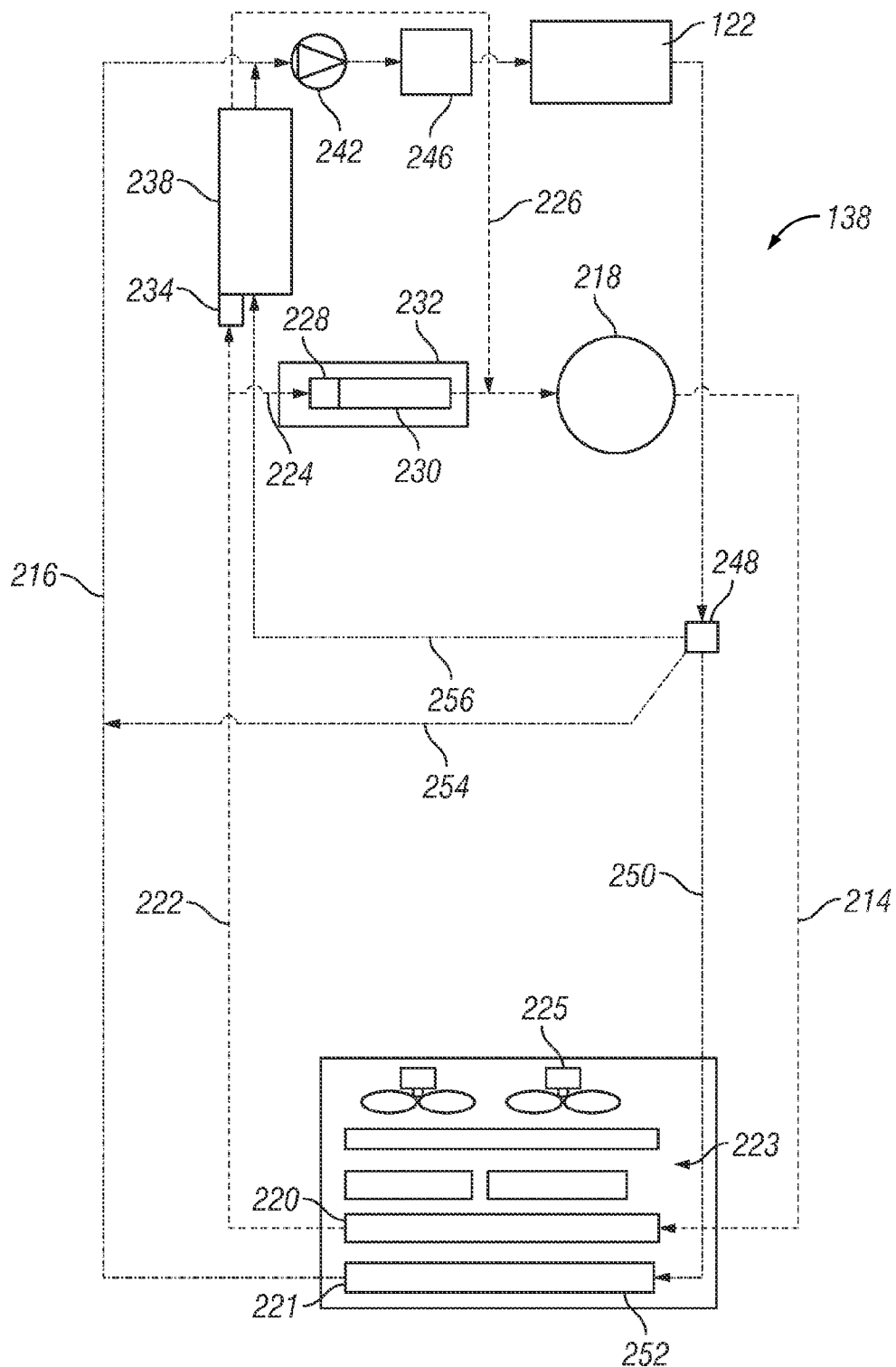
FIG. 3 is a schematic view of a thermal conditioning system of the control system of FIG. 1, in accordance with an alternate exemplary embodiment.
Figure 4:
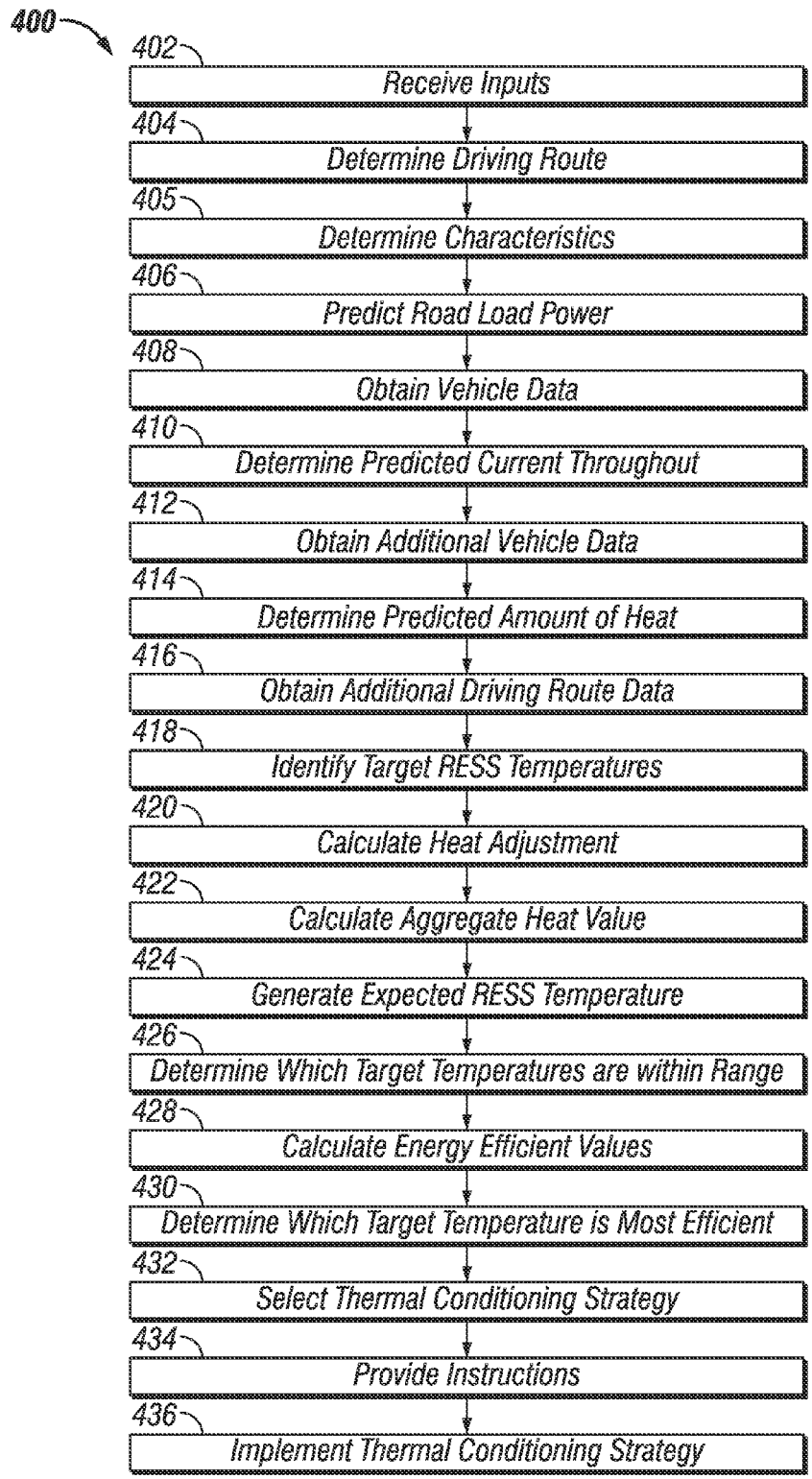
FIG. 4 is a flowchart of a process for thermally conditioning an RESS for a vehicle, and that can be used in connection with the vehicle, the RESS, and the control system of FIG. 1, and including the thermal conditioning systems of FIGS. 2 and 3, in accordance with an exemplary embodiment.

FIG. 3 illustrates another example of the thermal conditioning system 138, in accordance with a second exemplary embodiment. The embodiment of FIG. 3 may be used, for example, in connection with an extended range electric vehicle. Because the embodiment of FIG. 3 is similar to that of FIG. 2, similar element numbers will be used for similar elements, which also have similar functions as those described above in connection with FIG. 2. In the embodiment of FIG. 3, the RESS radiator 252 may be part of the CRFM 221. While the two embodiments of FIGS. 2 and 3 may have somewhat different configurations, the processes, discussed below, for cooling and warming the RESS 122 may be essentially the same, if so desired FIG. 4 is a flowchart of a process 400 for thermally conditioning an RESS for a vehicle, in accordance with an exemplary embodiment. The process 400 optimizes energy efficiency for the thermal conditioning of the RESS based on characteristics of the current driving route of the vehicle. The process 400 can be utilized in connection with the vehicle 100, the RESS 122, and the RESS control system 124 of FIG. 1, including the thermal conditioning system 138 embodiments of FIGS. 2 and 3.

As depicted in FIG. 4, the process 400 includes the step of receiving inputs (step 402). The inputs pertain to a geographic location and/or destination of the vehicle. In a preferred embodiment, during step 402, the navigation system 140 of FIG. 1 receives inputs from a driver or other occupant of the vehicle as to an intended destination for the vehicle in a current vehicle drive cycle (for example, a current ignition cycle of the vehicle). In addition, the navigation system 140 also preferably receives information from one or more satellites or networks as to a current geographic location of the vehicle.

A driving route of a current drive cycle (or ignition cycle) of the vehicle is determined (step 404). Preferably, the driving route is determined for a current vehicle drive cycle based on the current location of the vehicle and the inputs received from the driver or other vehicle occupant during step 402. In situations in which inputs are not received from a driver or other occupant of the vehicle, the driving route may instead be determined based on the current geographic location and direction of travel of the vehicle (preferably obtained by the navigation system 140 of FIG. 1), a day of the week and/or time of day (preferably obtained by the navigation system 140 of FIG. 1 from one or more satellites or networks, or by the processor 154 of FIG. 1), and/or a history of driving patterns for the particular vehicle and/or driver (preferably stored in the memory 156 of FIG. 1 as stored values 166 thereof), for example as learned by the navigation system 140 and/or the processor 154 over time for the particular vehicle and/or driver. The driving route is preferably determined by the navigation system 140 of FIG. 1 for the current drive cycle. In certain embodiments, the driving route is determined in whole or in part by the processor 154 of FIG. 1. In either case, the driving route is preferably determined continuously throughout the drive cycle and updated if any changes are made to the driving route (e.g., route detours).

Characteristics of the driving route are also determined (step 405). Preferably, the characteristics of the driving route include the following: a driving distance of the driving route, vehicle speed limits along the driving route, the road grade along the driving route, and the road altitude along the driving route. In one embodiment, the characteristics of the driving route are retrieved by the processor 154 of FIG. 1 from the stored values 166 stored in the memory 156 of FIG. 1. In another embodiment, the characteristics of the driving route are obtained by the navigation system, such as from a memory thereof and/or from a central database at a remote server that is in communication with the navigation system 140 of FIG. 1 via a wireless network.

The characteristics of the driving route are used to predict a road load power required from the RESS for the driving route (step 406). The road load power is preferably calculated over the entire driving route. In a preferred embodiment, the road load power is calculated by the processor 154 of FIG. 1 in accordance with the following equation:

$$P = \tfrac{1}{2}(A\rho C_d V^2 + C_R Mg + GrMg) \quad \text{(Equation 1),}$$

in which "P" represents the predicted road load power, "A" represents cross sectional area of vehicle, "$\rho$" represents the density of air, "$C_d$" represents an aerodynamic drag coefficient of the vehicle, "V" represents the speed limit(s) on the driving route, "$C_R$" represents a resistance coefficient (rolling resistance of vehicle), "M" represents the mass of the vehicle, "g" represents the coefficient of gravity (9.8 m/sec$^2$), and "Gr" represents the gradient of the road along the driving route.

In addition, vehicle data is also obtained (step 408). The vehicle data preferably includes values of an initial temperature of the RESS, an initial state of charge of the RESS, an initial resistance of the RESS, and an ambient temperature immediately surrounding the RESS for the current drive cycle, along with a measure of driver efficiency for the driver of the vehicle from one or more previous drive cycles. The vehicle data is preferably obtained via respective sensors, such as from the sensor array 142 of FIG. 1.

The vehicle data of step 408 is used along with the road load power of step 406 to determine a predicted current throughput for the RESS for the current drive cycle (step 410). The current throughput is preferably calculated over the entire driving route. The predicted current throughput is preferably calculated by the processor 154 of FIG. 1. In one embodiment, the RESS current throughput is calculated or predicting by creating an RESS model using the following equations:

$$P\_RESS = P\_\text{road load}/Eta\_ress \quad \text{(Equation 2), and}$$

$$I\_RESS = P\_RESS/V\_RESS \quad \text{(Equation 3),}$$

in which Eta_ress represents a discharge efficiency of the RESS (which is preferably a constant), P_RESS represents the output power required to drive the given profile, I_RESS represents the predicted RESS current output, and V_RESS represents the predicted RESS voltage. V_RESS is preferably a function of state of charge. Accordingly, the state of charge may be approximated by the following equation:

$$SOC = \text{Integral}(I\_RESS/Q\text{max})dt \quad \text{(Equation 4),}$$

in which Qmax represents the total usable capacity of the RESS (which is preferably a constant).

Additional vehicle data is also obtained (step 412). The additional vehicle data preferably includes a resistance of the RESS. The additional vehicle data of step 412 is preferably obtained via respective sensors, such as from the sensor array 142 of FIG. 1.

The additional vehicle data of step 412 is used along with the RESS current throughput of step 410 to determine a predicted amount of heat generated by the RESS for the current drive cycle (step 414). The predicted amount of heat generation is preferably calculated over the entire driving route. The predicted amount of heat generation is preferably calculated by the processor 154 of FIG. 1 in accordance with the following equation:

$$Q_H = I^2 * R \quad \text{(Equation 5),}$$

in which "$Q_H$" represents the amount of heat generated by the RESS, "I" represents the RESS current throughput of step 410, and "R" represents the RESS resistance of step 412.

Additional data pertaining to the driving route is also obtained (step 416). The additional data of step 416 includes an ambient temperature profile for the geographic locations along the driving route. The ambient temperature profile includes a heat measure ($Q_{Amb}$) pertaining to the environmental conditions along the driving route. In one embodiment, the ambient temperature profile is retrieved by the processor 154 of FIG. 1 from the stored values 166 stored in the memory 156 of FIG. 1. In another embodiment, the ambient temperature profile is obtained by the navigation system, such as from a memory thereof and/or from a central database at a remote server that is in communication with the navigation system 140 of FIG. 1 via a wireless network.

In addition, various target RESS temperatures are identified (step 418). The target RESS temperatures represent possible target RESS temperature settings for the RESS. The target RESS temperatures are preferably retrieved from the memory 156 of FIG. 1 as stored values 166 therein by the processor 154 of FIG. 1.

A heat adjustment ($Q_T$) is then calculated for each of the various target RESS temperatures (step 420). Each heat adjustment reflects a change in heat of the RESS resulting from thermal conditioning actions associated with a specific target RESS temperature. The heat adjustment is preferably calculated by the processor 154 of FIG. 1 as a function of the initial RESS temperature and the target RESS temperature for each of the target RESS temperatures. In a preferred embodiment, the thermal control strategy operates using an algorithm that selects which heating or cooling mode to use based on a predicted RESS temperature (preferably from the output of step 424 below) and then commands the actuators to drive the RESS temperature to a desired target value from step 418 above. Each heating or cooling mode would preferably have an associated Q_dot_T (heat transfer performance) which would be an input to the RESS thermal plant model. Also in a preferred embodiment, the thermal control strategy operates utilizes corresponding steps from or similar to those described in connection with co-pending, commonly assigned U.S. patent application Ser. No. 12/894,553, entitled Thermal Management Controls for a Vehicle Having a Rechargeable Energy Storage System.

An aggregate (or total) heat value is then calculated for the RESS for each of the target RESS temperatures (step 422). The aggregate heat value is preferably calculated by the following equation:

$$Q_{Agg} = Q_H + Q_{Amb} + Q_T \quad \text{(Equation 6)},$$

in which "$Q_{Agg}$" represents the aggregate total heat value, "$Q_H$" represent the amount of heat generated by the RESS from step 414, "$Q_{Amb}$" represents the heat value corresponding to the ambient temperature profile of step 416, and "$Q_T$" represents the heat adjustment of step 420.

The aggregate heat value is then utilized to generate an expected RESS temperature (or temperature range) for each of the target RESS temperatures (step 424) for the drive cycle and the driving route used therein. The RESS temperature calculations of step 424 are preferably performed by the processor 154 of FIG. 1. In a preferred embodiment, step 424 utilizes another thermal plant mode for the RESS where the temperature at time (i+1) is a function of the heat transfer at time (i) and the previous RESS temperature at time (i). This model is depicted with the following equations:

$$Q_{Total} = Q_H + Q_{Amb} + Q_{TS} \quad \text{(Equation 7)},$$

$$\Delta T_{RESS} = Q_{Total}/C_{RESS} \quad \text{(Equation 8), and}$$

$$T_{RESS i+1} = T_{RESS i} + \Delta T_{RESS} \quad \text{(Equation 9)},$$

in which $\Delta T_{RESS}$ represents a change in temperature for the RESS, $C_{RESS}$ is the heat transfer coefficient of the RESS, and the other variables are similar to those described above in connection with Equations 1-6.

A determination is made as to which of the RESS target temperatures provide resulting respective RESS temperature ranges in step 424 that are within acceptable RESS ranges given the driving route and the various other values of steps 402-424 (step 426). Specifically, for each of the target RESS temperatures identified in step 418, a determination is made as to whether the resulting RESS temperature or temperature range is within acceptable limits for the RESS. In one embodiment, this comprises determinations as to whether a maximum RESS temperature from step 424 for each particular target RESS temperature of step 418 is below a predetermined upper bound of an acceptable temperature range for the RESS. Each of the RESS target temperatures that satisfy the criteria of step 426 are designated to be part of a subset of the target RESS temperatures that are acceptable options for use in thermal conditioning of the RESS. The determinations of step 426 are preferably performed by the processor 154 of FIG. 1.

For each of the subset of target RESS temperatures from step 426, an energy efficiency value is calculated (step 428). In a preferred embodiment, during step 428, a measure of energy efficiency is determined for thermal conditioning actions that are associated with each of the subset of target RESS temperatures that satisfy the conditions of step 426. In one embodiment, the energy efficiency measure pertains to efficiency of energy storage. In another embodiment, the energy efficiency measure pertains to efficiency of energy retention. In a further embodiment, the energy efficiency measure pertains to efficiency of energy transfer to the inverters of the vehicle. In one embodiment, a calculation is made as to the total amount of energy required to run all components that heat or cool the RESS (such as air conditioning compressors, pumps, fans, and the like). Also in one embodiment, energy efficiency is measured by integrating the total power over the drive cycle to determine how much energy (in kilowatt hours) would be required to maintain RESS temperatures within predetermined limits (for example, that represent or correspond to optimal or acceptable functioning of the RESS). In one such embodiment, the parameter set with the least amount of energy consumption is the desired target temperature calibration set.

The measures of efficiency are preferably calculated by the processor 154 of FIG. 1. In one preferred embodiment, the total power is calculated for energy efficiency comparisons as being equal to the power of each of the various components (such as a summation of the power of the air conditioning compressor, the power of the pump, the power of the CRFM, and the like). Also in one preferred embodiment, the total energy is calculated for energy efficiency comparisons by integrating the total power over the total drive profile for the drive cycle.

The energy efficiency values of step 428 associated with the different target RESS temperatures of the subset of step 426 are then compared, and a determination is thereby made as to which of the different target RESS temperatures of the subset of step 426 is the most energy efficient (step 430). This determination is preferably made by the processor 154 of FIG. 1. Specifically, in a preferred embodiment, an optimal target RESS temperature is selected by the processor 154 of FIG. 1 as the target RESS temperature that requires the least amount of energy, among the various target RESS temperatures that satisfy the requirements that the RESS temperature remain in an acceptable range.

A thermal conditioning strategy associated with the selected target RESS temperature of step 430 is then selected (step 432). The thermal conditioning strategy comprises one or more thermal conditioning actions (such as by, way of example only, a fan speed, a pump speed, a flow rate for a coolant fluid, a measure of heat exchanger operation, one or more other actions described above in connection with the thermal conditioning systems 138 of FIGS. 1-3, and/or one or more other actions that may affect the heating or cooling provided by the thermal conditioning system 138 of FIGS. 1-3) that are designed to attain the target RESS temperature for the RESS. In a preferred embodiment, once a target temperature calibration set is chosen, the algorithm would use the chosen values to control the devices during the drive cycle, such as from the control devices described above in FIGS. 1-3 above and in co-pending, commonly assigned U.S. patent application Ser. No. 12/894,553, entitled Thermal Management Controls for a Vehicle Having a Rechargeable Energy Storage System. This provides for potentially more efficient heating and cooling of the RESS. In a preferred embodiment, the thermal conditioning strategy is selected by the processor 154 of FIG. 1.

Instructions are then provided (preferably by the processor 154 to the thermal conditioning system 138 of FIGS. 1-3) to implement the thermal conditioning strategy (step 434). The thermal conditioning strategy is then implemented (step 436). Preferably, the thermal conditioning strategy is implemented by the thermal conditioning system 138 of FIGS. 1-3 based on instructions provided by the processor 154 of FIG. 1, in order to thermally condition the RESS 122 of FIG. 1 in a manner that optimizes energy efficiency subject to the constraints of maintaining the RESS temperature within acceptable limits. The RESS is thereby thermally conditioned in a manner that is specifically tailored to the conditions associated with the current drive cycle, including the specific driving route being taken in the current drive cycle.

Figure 5:
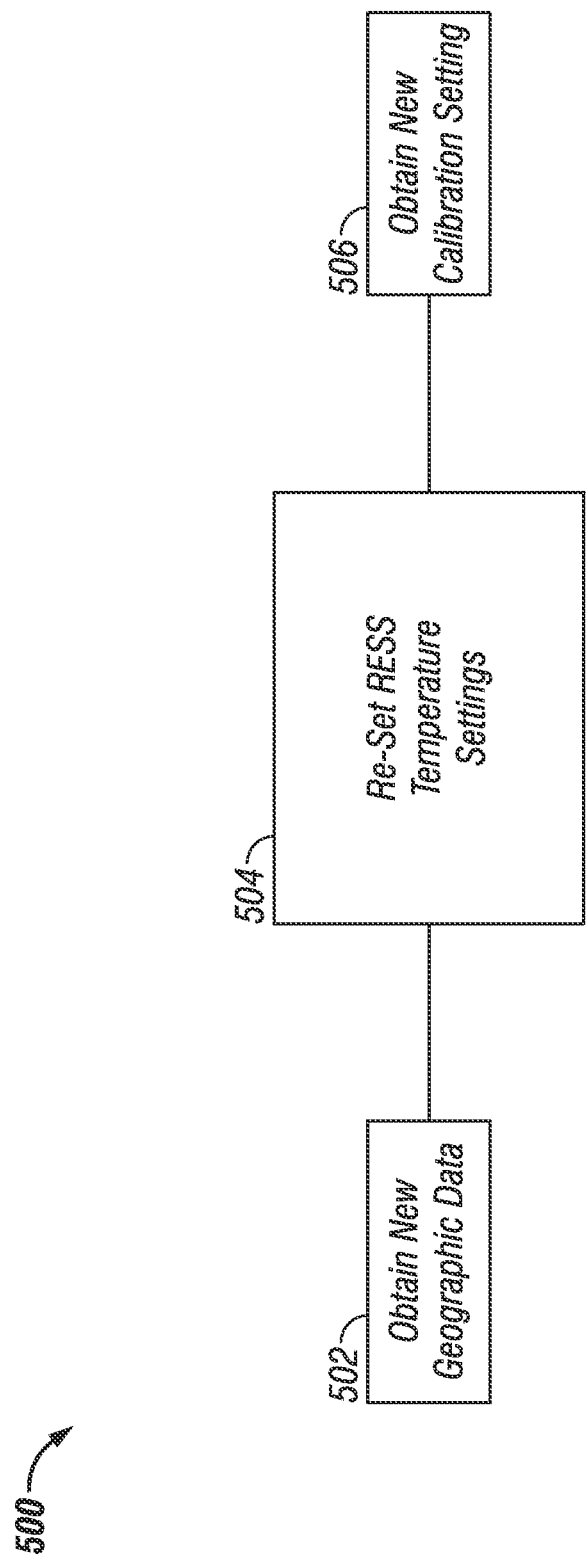
FIG. 5 is a flowchart of a process for implementing the process of FIG. 4, for example using new geographic data, in accordance with an exemplary embodiment.

FIG. 5 is a flowchart of a process 500 for implementing the process 400 of FIG. 4, for example using new geographic data, in accordance with an exemplary embodiment. Preferably the steps of the process 500 occur during the process 400 of FIG. 4. Specifically, new geographic data is obtained (step 502). Preferably, the new geographic data pertains to geographic data obtained via step 402 of the process 400 of FIG. 4 described above, but represents a new driving route (as determined in step 404 of the process 400 of FIG. 4). In certain embodiments, the new driving route may be learned and/or ascertained, such as based on driving patterns, a time of day, a day of the week, and the like, for example similar to the discussion above with respect to step 404 of the process 400 of FIG. 4. Accordingly, during step 502, if the driver or other user does not specify a destination, a drive learning algorithm can predict where the driver is going and optimize the RESS thermal control for that learned route.

Once it is determined that a new driving route is being undertaken, the RESS temperature settings are re-set in order to optimize energy efficiency in accordance with the new driving route (step 504). Preferably, during step 504, steps 404-428 of the process 400 of FIG. 4 are performed for the new driving route as determined from step 502. As a result, a new target temperature calibration setting is obtained for the RESS (step 506). Preferably, the new target temperature calibration setting of step 506 corresponds to that of step 430 of the process 400 of FIG. 4, but corresponding to the new driving route of step 502 and the new calculations of step 504.

Figure 6:
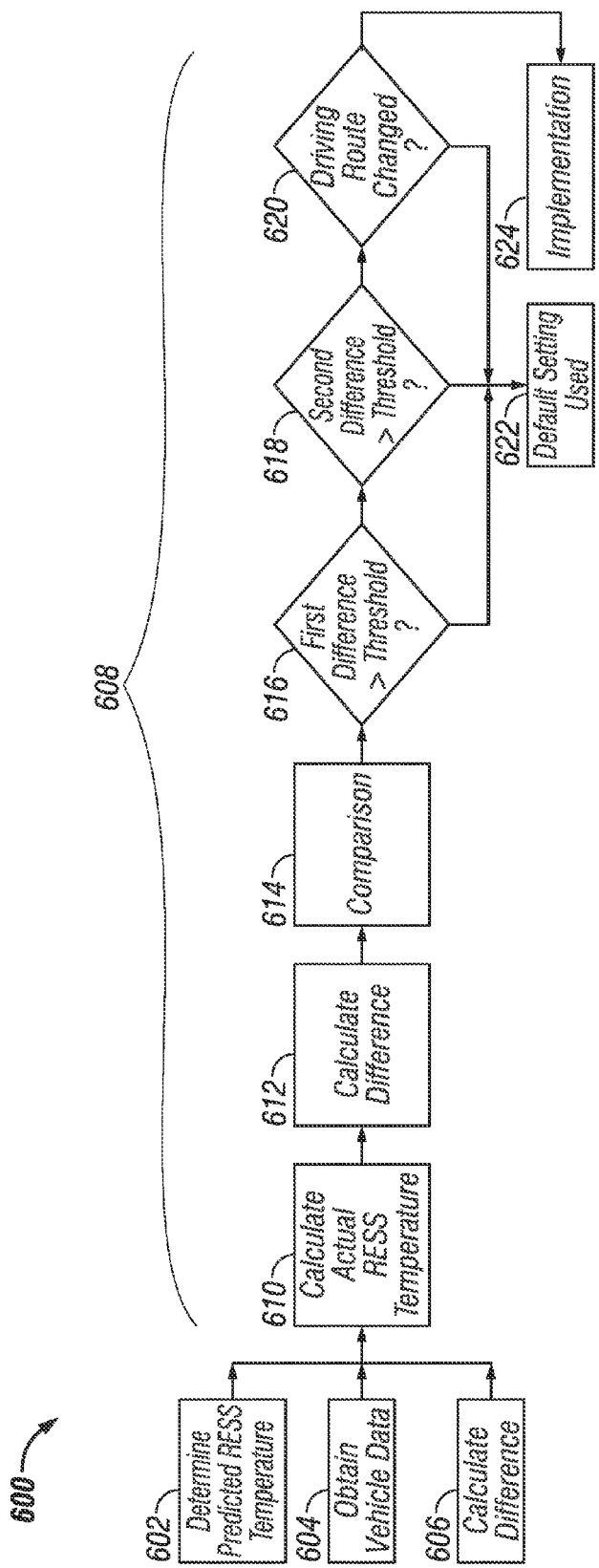
FIG. 6 is a flowchart of a process for implementing the process of FIG. 4, for example in monitoring various parameter values thereof, in accordance with an exemplary embodiment.

FIG. 6 is a flowchart of a process 600 for implementing the process 400 of FIG. 4, for example in monitoring various parameter values thereof, in accordance with an exemplary embodiment. Preferably the steps of the process 600 occur during the process 400 of FIG. 4. Specifically, a predicted RESS temperature is determined (step 602). The predicted RESS temperature preferably corresponds to that determined in step 424 of the process 400 of FIG. 4. In addition, vehicle data is obtained (step 604). The vehicle data preferably corresponds to the vehicle data of step 408 of the process 400 of FIG. 4, and preferably includes data pertaining to ambient temperatures, actual RESS temperatures, and an actual speed for the vehicle. In addition, geographic data is obtained (step 606). The geographic data preferably includes the geographic data of step 402 of the process 400 of FIG. 4 as well as the characteristics pertaining to the driving route of step 405 of the process 400 of FIG. 4 (preferably including the speed limits of the driving route).

With further reference to FIG. 6, a monitoring block or algorithm 608 is implemented using the data of steps 602-606. Specifically, a difference between the predicted RESS temperature (obtained in step 602) and the actual RESS temperature (obtained in step 604) is calculated, preferably by the processor 154 of FIG. 1 (step 610). In addition, a difference between a predicted vehicle speed (preferably, corresponding to the speed limits from step 606) and an actual vehicle speed (preferably as obtained in step 604 with the vehicle data, and/or as calculated via data obtained from one or more wheel speed sensors of the sensor array 142 of FIG. 1), preferably by the processor 154 of FIG. 1 (step 612). In addition, a comparison is made between the most recent geographic data (preferably, from step 604) and a driving route on which the vehicle was believed to be travelling (preferably as determined in a prior iteration of step 606 and/or of steps 402 and/or 405 of FIG. 4), and preferably by the processor 154 of FIG. 1 (step 614).

A determination is made as to whether the difference between the predicted and actual RESS temperatures (as determined in step 610) is greater than a predetermined threshold (step 616). In one embodiment, the determination of step 616 comprises a determination as to whether an absolute value of the difference of step 610 corresponds to a percentage error that is greater than a predetermined percentage. The threshold is preferably a calibration. In one example, the predetermined percentage is equal to five percent; however, this may vary in other embodiments. The determination of step 616 is preferably made by the processor 154 of FIG. 1.

A determination is also made as to whether the difference between the predicted and actual vehicle speeds (as determined in step 612) is greater than a predetermined threshold (step 618). In one embodiment, the determination of step 618 comprises a determination as to whether an absolute value of the difference of step 612 corresponds to a percentage error that is greater than a predetermined percentage. The threshold is preferably a calibration. In one example, the predetermined percentage is equal to five percent; however, this may vary in other embodiments. The determination of step 618 is preferably made by the processor 154 of FIG. 1.

In addition, a determination is made as to whether the driving route has been cancelled and/or otherwise changed by the driver (based on the comparison of step 614) (step 620). The determination of step 620 is preferably made by the processor 154 of FIG. 1 as to whether the current (or most recently determined) driving route is different from that determined at some time prior (for example, during a prior iteration of step 405 of the process 400 of FIG. 4).

If the determination of one or more of steps 616, 618, and/or 620 is "yes", then the process proceeds to step 622, described below. Specifically, the process proceeds to step 622 if any one or more of the following conditions are satisfied: (i) the difference between the predicted and actual RESS temperature is greater than a predetermined threshold, (ii) the difference between the predicted and actual vehicle speeds is greater than a predetermined threshold, and/or (iii) the driving route has been cancelled and/or otherwise changed. If any of these conditions are satisfied, the process 400 of FIG. 4 terminates, and a default calibration setting is used for the RESS temperature (step 622). The default calibration setting preferably corresponds to a manufacturer-specified default setting as stored in the memory 156 of FIG. 1, and is preferably retrieved therefrom and implemented by the processor 154 of FIG. 1. Conversely, if none of the criteria of steps 616-620 are satisfied, the process 400 of FIG. 4 continues instead in accordance with the steps set forth above in connection with FIG. 4, and the calibration setting for the RESS temperature is determined and set in accordance with the steps of the process 400 of FIG. 4, preferably via the processor 154 of FIG. 1 (step 624).

Thus, in accordance with the process 600 of FIG. 6, if the actual RESS temperature deviates from the predicted RESS temperature by more than an allowable value during the driving cycle, the chosen target temperature calibration setting shall be reset to a default calibration setting. Similarly, if the actual vehicle speed deviates from the predicted vehicle speed by more than an allowable value during the driving cycle, the chosen target temperature calibration setting shall be reset to a default calibration setting. Likewise, if the driving route is cancelled, the chosen target temperature calibration setting shall be reset to a default calibration setting.

Accordingly, methods, systems, and vehicles are provided that for thermal conditioning of a vehicle RESS. It will be appreciated that the disclosed methods, systems, and vehicles may vary from those depicted in the Figures and described herein. For example, the vehicle 100, the RESS control system 124, the thermal conditioning system 138, and/or various components thereof may vary from that depicted in FIGS. 1-3 and described in connection therewith. In addition, it will be appreciated that certain steps of the processes 400, 500, 600 may vary from those depicted in FIGS. 4-6 and/or described above in connection therewith. It will similarly be appreciated that certain steps of the process described above may occur simultaneously or in a different order than that depicted in FIGS. 4-6 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for thermally conditioning a rechargeable energy storage system (RESS) of a vehicle during a drive cycle, the method comprising the steps of:
   determining a driving route for the vehicle for the drive cycle;
   predicting an RESS temperature for the drive cycle corresponding to each of a plurality of target RESS temperatures based at least in part on the driving route; and
   selecting one of the plurality of target RESS temperatures based on the predicted RESS temperatures;
   selecting one of a plurality of thermal conditioning actions based at least in part on the selected one of the plurality of target RESS temperatures; and
   conditioning the RESS by applying the selected one of the plurality of thermal conditioning actions.

2. The method of claim 1, further comprising the steps of:
   determining a current location of the vehicle; and
   receiving an input as to an intended destination from an occupant of the vehicle;
   wherein the step of determining the driving route comprises the step of determining the driving route using the current location and the input.

3. The method of claim 1, wherein the step of selecting the one of the plurality of target RESS temperatures comprises the steps of:
   calculating an energy efficiency value for each of a subset of the plurality of target RESS temperatures that provide predicted RESS temperatures within an acceptable range; and
   estimating an energy efficiency of each of the subset of the plurality of target RESS temperatures;
   wherein the selected one of the plurality of target RESS temperatures is selected to have a greatest energy efficiency value among the subset of the plurality of target RESS temperatures.

4. The method of claim 1, wherein the step of predicting the RESS temperatures comprises the steps of:
   retrieving one or more characteristics of the driving route; and
   predicting a road load power based at least in part on the one or more characteristics;
   wherein the predicted RESS temperature corresponding to the selected one of the plurality of target RESS temperatures is predicted based at least in part on the road load power.

5. The method of claim 4, wherein the step of predicting the RESS temperature further comprises the steps of:
   retrieving vehicle data pertaining to a condition of the vehicle, a driver efficiency from a prior drive cycle, or both; and
   predicting an RESS current throughput for the drive cycle using the vehicle data and the road load power;
   wherein the predicted RESS temperature corresponding to the selected one of the plurality of target RESS temperatures is predicted based also at least in part on the RESS current throughput.

6. The method of claim 5, wherein the step of predicting the RESS temperature further comprises the steps of:
   retrieving additional data pertaining to a resistance of the RESS; and
   predicting an amount of heat generated by the RESS using the additional data and the RESS current throughput;
   wherein the predicted RESS temperature corresponding to the selected one of the plurality of target RESS temperatures is predicted based also at least in part on the additional data and the RESS current throughput.

7. A control system for thermally conditioning a rechargeable energy storage system (RESS) of a vehicle during a drive cycle, the control system comprising:
- a thermal conditioning system configured to apply a plurality of thermal conditioning actions for the RESS; and
- a controller coupled to the thermal conditioning system and configured to:
  - determine a driving route for the vehicle for the drive cycle;
  - predict an RESS temperature for the drive cycle corresponding to each of a plurality of target RESS temperatures based at least in part on the driving route;
  - select one of the plurality of target RESS temperatures based on the predicted RESS temperatures;
  - select one of the plurality of thermal conditioning actions based at least in part on the selected one of the plurality of target RESS temperatures; and
  - provide instructions for the thermal conditioning system to apply the selected one of the plurality of thermal conditioning actions for the RESS.

8. The control system of claim 7, wherein the controller is further configured to:
- calculate an energy efficiency value for each of a subset of the plurality of target RESS temperatures that can be utilized in connection with the RESS;
- estimate an energy efficiency of each of the subset of the plurality of target RESS temperatures; and
- select the one of the plurality of target RESS temperatures to have a greatest energy efficiency value among the subset of the plurality of target RESS temperatures.

9. The control system of claim 7, wherein the controller is further configured to:
- retrieve one or more characteristics of the driving route;
- predict a road load power based at least in part on the one or more characteristics; and
- predict the RESS temperature based at least in part on the road load power.

10. The control system of claim 9, wherein the controller is further configured to:
- retrieve vehicle data pertaining to a condition of the vehicle, a driver efficiency from a prior drive cycle, or both;
- predict an RESS current throughput for the drive cycle using the vehicle data and the road load power; and
- predict the RESS temperature based also at least in part on the RESS current throughput.

11. The control system of claim 10, wherein the controller is further configured to:
- retrieve additional data pertaining to a resistance of the RESS;
- predict an amount of heat generated by the RESS using the additional data and the RESS current throughput; and
- predict the RESS temperature based also at least in part on the additional data and the RESS current throughput.

12. A vehicle comprising:
- a drive system including a rechargeable energy storage system (RESS); and
- a thermal conditioning system coupled to the RESS and configured to apply a plurality of thermal conditioning actions for the RESS; and
- a control system coupled to the thermal conditioning system and configured to:
  - determine a driving route for the vehicle for a drive cycle of the vehicle;
  - predict an RESS temperature for the drive cycle corresponding to each of a plurality of target RESS temperatures based at least in part on the driving route;
  - select one of the plurality of target RESS temperatures based on the predicted RESS temperatures;
  - select one of the plurality of thermal conditioning actions based at least in part on the selected one of the plurality of target RESS temperatures; and
  - provide instructions for the thermal conditioning system to apply the selected one of the plurality of thermal conditioning actions for the RESS.

13. The vehicle of claim 12, wherein the control system is further configured to:
- obtain a measured value of RESS temperature; and
- re-set the target RESS temperature to a default calibration if a difference between the predicted RESS temperature and the measured value of RESS temperature is greater than a predetermined threshold.

14. The vehicle of claim 12, wherein the control system is further configured to:
- calculate an energy efficiency value for each of a subset of the plurality of target RESS temperatures that can be utilized in connection with the RESS;
- estimate an energy efficiency of each of the subset of the plurality of target RESS temperatures; and
- select the one of the plurality of target RESS temperatures to have a greatest energy efficiency value among the subset of the plurality of target RESS temperatures.

15. The vehicle of claim 12, wherein the control system is further configured to:
- retrieve one or more characteristics of the driving route;
- predict a road load power based at least in part on the one or more characteristics; and
- predict the RESS temperature based at least in part on the road load power.

16. The vehicle of claim 15, wherein the control system is further configured to:
- retrieve vehicle data pertaining to a condition of the vehicle, a driver efficiency from a prior drive cycle, or both;
- predict an RESS current throughput for the drive cycle using the vehicle data and the road load power; and
- predict the RESS temperature based also at least in part on the RESS current throughput.

17. The vehicle of claim 16, wherein the control system is further configured to:
- retrieve additional data pertaining to a resistance of the RESS;
- predict an amount of heat generated by the RESS using the additional data and the RESS current throughput; and
- predict the RESS temperature based also at least in part on the additional data and the RESS current throughput.

* * * * *